United States Patent Office 3,359,312
Patented Dec. 19, 1967

3,359,312
N-(S-BENZYLTHIOETHYL)PHOSPHORAMIDO-
THIOIC DICHLORIDE
Bernard Buchner, Westfield, and George G. Curtis, Elizabeth, N.J., assignors, by mesne assignments, to Continental Oil Company, a corporation of Delaware
No drawing. Filed July 16, 1963, Ser. No. 295,531
1 Claim. (Cl. 260—543)

One of the objects of this invention is to produce novel herbicidal compositions. The herbicidally active ingredients of these compositions are derivatives of thiophosphoryl chloride ($PSCl_3$) and are monosubstituted organic phosphorodichloridothionates. They all have the following general structure:

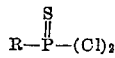

Specifically R is a member of the class consisting of (1) O-(2-naphthyl), (2) O-(p-chlorophenyl), (3) O-(p-methoxyphenyl), (4) O-(p-cresyl), (5) O-(phenyl) and (6) N-(S-benzylthioethyl) radicals.

The herbicidal compositions are prepared from the active compounds of this invention in the manner generally known in the art. They are used in conjunction with gaseous, liquid or solid inert carriers customarily employed in the production of herbicidal compositions, such as dusting powders, suspensions, emulsions, solutions, aerosols, wettable powders, etc.

Solvents may include acetone, methyl alcohol, isopropyl acetate, butyl carbitol acetate, isopropyl alcohol, cyclohexane, cyclohexanone, benzene, xylene, methylated naphthalenes (also known as aromatic petroleum derivative solvents), carbon tetrachloride, methyl chloride and others, either alone or in admixture. The methylated naphthalenes range in Kauri-Butanol values from about 65 to about 100, in initial boiling point from about 485° to about 590° F.

Solid carriers may be selected from talc, clay, kaolin, lime, bentonite, pumice, fuller's earth, absorbent silicas, pyrophilite, etc., preferably in finely divided state. These can be applied as herbicidal dusts or as wettable powders with the addition of surface active agents. The latter can be made into water dispersions or suspensions.

For aerosol application liquified gases are used as solvents, such as fluorochlorethanes, fluorochlormethanes or methyl chloride and they are applied from aerosol bombs made from the solutions.

Solvent solutions may be converted to water suspensions or emulsions. For the preparation of emulsions or wettable powders surface active agents are incorporated into the herbicidal compositions. When preparing emulsions they aid emulsification, whereas in preparing wettable powders they aid suspension and dispersion properties. The following is a list of some useful surface active agents:

Triton X-161, a blend of alkyl aryl polyether alcohols and organic sulfonates;
Pluronic L-61, a condensate of ethylene oxide with a hydrophobic base formed by condensing propylene oxide with propylene glycol;
Marasperse N, sodium lignosulfonate;
Igepal CO-730, an alkylphenoxypoly-(ethylenoxy)-ethanol, formed by condensing nonylphenol with ethylene oxide;
Diglycol oleate;
p-Isooctyl phenyl ether of polyethylene glycol;
Polyalkylene glycol derivatives;
Alkylbenzenesulfonates;
Alkene sulfonates;
Alkyl sulfates, such as fatty alcohol sulfates;
Condensation product of 1 mol of octyl phenol with 8 mols of ethylene oxide;
Naphthalene sulfonates and alkyl naphthalene sulfonates;
Ricinoleic acid butyl ester sulfonate.

Water suspensions can be prepared by dissolving the water-insoluble active compound in a water miscible solvent, like actone, and adding this solution to water under agitation. By another method a water wettable dry powder mixture is prepared, e.g. containing water dispersible clay carrier, with or without the presence of surface active agents and this mixture is dispersed in water prior to use.

Concentrated herbicidal compositions may contain 0.1% to 30% by weight of active compound and 99.9% to 70% of inert carrier, such as solvent, water, solid powder carriers, surface active agents and their admixture.

The six active compounds of this invention are:

(1) O-(2-naphthyl) phosphorodichloridothionate

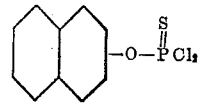

hereinafter called Compound No. 1, (2) O-(p-chlorophenyl) phosphorodichloridothionate

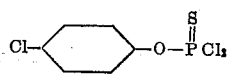

(Compound No. 2), (3) O-(p-methoxyphenyl) phosphorodichloridothionate

(Compound No. 3), (4) O-(p-cresyl) phosphorodichloridothionate

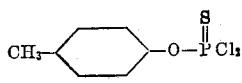

(Compound No. 4), (5) O-(phenyl) phosphorodichloridothionate

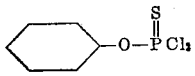

(Compound No. 5), and (6) N-(S-benzylthioethyl) phosphoramidothioic dichloride

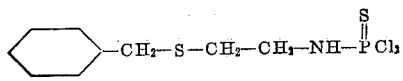

(Compound No. 6).

The preparation of Compound No. 6 is described in Example 1.

*Example 1.—N-(S-benzylthioethyl) phosphoramidothioic dichloride*

First a solution of 169.4 grams (1.0 mol) of thiophosphoryl chloride was prepared in 1.3 liters of toluene and cooled to —5° C. To this solution there was added slowly a solution of 111.3 grams (1.1 mols) of triethylamine dissolved in 300 ml. of toluene, followed by the addition of 167.2 grams (1.0 mol) of S-benzylthioethylamine in 500 ml. of toluene, while the temperature was maintained at —5° C. After the addition was completed, the reaction mixture was stirred for 4 hours at room temperature, whereupon the contents were cooled to 0° C. and the triethylamine hydrochloride was filtered off under suction. The filtrate was concentrated under vacuum to a volume of 700 ml., was washed twice with 200 ml. quantities of distilled water and the organic layer separated and dried over anhydrous magnesium sulfate. The drying agent was then removed by filtration and the remaining solvent was removed under vacuum. The crude residue was distilled in an 'ASCO' molecular still. The refractive index ($N_D^{20}$) was 1.6077 and the density ($d_4^{20}$) was 1.334.

Example 2 describes the preparation of Compound No. 1.

*Example 2.—O-(2-naphthyl)phosphorodichloridothionate*

First Solution A was prepared by dissolving 576.8 grams of beta-naphthol (4.0 mols) and 445.2 grams of triethylamine (4.4 mols) in 2½ liters of ethyl ether. Next Solution B was prepared by dissolving 745.8 grams of $PSCl_3$ (4.4 mols) in one liter of ethyl ether. Both solutions were cooled to 0° C. and at that temperature Solution A was gradually added with stirring to Solution B over a period of five hours. The reaction mixture was then heated at refluxing temperature for three hours, cooled to —10° C. and the triethylamine hydrochloride was removed by filtration. The solvent was then removed by distillation at 40°–60° C. and the crude product purified by molecular distillation at 70 microns pressure at 160–170° C. (Low boiling byproducts were removed at lower temperatures.)

Compounds No. 2, 3, 4 and 5 can be prepared by reacting the corresponding aqueous sodium phenolate with thiophosphoryl chloride ($PSCl_3$) at temperatures ranging from zero to 5° C., separating the water-insoluble organic layer from water, drying and purifying by molecular distillation. The sodium chloride formed remains in the aqueous layer.

*Illustrative tests*

To illustrate the herbicidal activity and some other properties of the active compounds of this invention, various test methods will be given. For ease of reference the test methods will be numbered.

*Test Method No. 1*

In this herbicidal screening test the active materials were prepared as 1%, 0.1% and 0.01% solutions or fine dispersions in deionized water. Wherever required, suitable solvents are used to accomplish the formation of solutions or fine dispersions. Fifty radish seeds and fifty wheat seeds are placed in closed jars containing 100 ml. of the respective solution and kept there under mild mixing for 24 hours. The seeds are then thoroughly washed with tap water and placed in moist paper towels for germination. The germinating cabinet, containing the towels, is kept warm and humid during the test. Six days later observation is made. Percentage of germination and notations of any abnormal seedling growth are recorded. The radishes represent dicots and wheat represents monocots. The ratings were numbered 0 to 5, as follows: 0=less than 30% non-germinating seeds at 1% concentration; 1=30 to 90% non-germinating at 1.0% concentration; 2=more than 90% non-germinating at 1.0% concentration, but less than 30% non-germinating at 0.1% concentration; 3=30 to 90% non-germinating seeds at 0.1% concentration; 4=more than 90% non-germinating at 0.1% concentration, but less than 30% non-germinating at 0.01% concentration; and 5=more than 30% non-germinating seeds at 0.01% concentration. In Table I, below, the results with Compounds 1 to 5 are given.

TABLE I

| Coumpound No. | Radish Ratings | Wheat Ratings |
|---|---|---|
| 1 | 5 | 5 |
| 2 | 4 | 4 |
| 3 | 5 | 3 |
| 4 | 5 | 3 |
| 5 | 4 | 3 |

As it can be seen, all five compounds were very potent germination inhibitors in this water-media test. Compounds 1 and 2 were non-selective and acted equally on both seeds tested. Compounds 3, 4 and 5 showed selectivity for radishes in affecting these seeds more than the wheat seeds. Compound 1 was subsequently tested in greenhouse post-emergent screening by spraying it on leaf surfaces at 24 lbs./acre rate. At this concentration it completely killed peas and radishes and severely injured tomatoes and wheat.

*Test Method No. 2.—Post-emergent herbicidal screening*

In this test dicots were represented by bush beans, radishes, tomato, pigweed and crimson clover. Monocots were represented by oats, crabgrass and ryegrass. The compounds are prepared as 10% acetone solutions. Flats were prepared by seeding ahead of time of chemical application. On the day of application pigweed was 27 days old; crabgrass, radishes, ryegrass and crimson clover 23 days old; bush beans, oats and tomato transplants 19 days old. Flats were treated twice with Fermate during germination and early seedling stage to prevent "damping off" of pigweed, clover and beans. All applications were at a rate of 19.2 lbs./acre. Compound 6 was tested by this method. Ratings were made after 1 day, 8 days and 14 days. The ratings run from 0=no effect to 20=complete kill. The rating value indicates the degree of injury, not the type of injury or effect. The diluent was 0.1% solution of Igepal CO–730 in water. The flats were 12" x 18" size and contained all 8 crops. 3 ml. of the acetone solution was first sprayed on the plants, followed immediately with 10 ml. of the Igepal solution. The procedure is followed to avoid coarse precipitation of some compounds which may form if dilution is carried out prior to spraying. Table II shows the results.

TABLE II

| Plant | Days | Compound No. 6 | Acetone check | Control |
|---|---|---|---|---|
| Dicots: | | | | |
| Bush Bean | 1 | 18 | 0 | 0 |
| | 8 | 13 | 0 | 0 |
| | 14 | 10 | 1 | 1 |
| Average | | 13.7 | 0.3 | 0.3 |
| Radish | 1 | 14 | 0 | 1 |
| | 8 | 9 | 0 | 0 |
| | 14 | 4 | 0 | 0 |
| Average | | 9.0 | 0.0 | 0.3 |
| Tomato | 1 | 16 | 0 | 0 |
| | 8 | 11 | 0 | 0 |
| | 14 | 10 | 0 | 0 |
| Average | | 12.3 | 0.0 | 0.0 |
| Pigweed | 1 | 20 | 0 | 0 |
| | 8 | 19 | 0 | 0 |
| | 14 | 19 | 0 | 0 |
| Average | | 19.3 | 0.0 | 0.0 |
| Crimson Clover | 1 | 17 | 2 | 0 |
| | 8 | 12 | 0 | 0 |
| | 14 | 8 | 0 | 0 |
| Average | | 12.3 | 0.7 | 0.0 |
| Dicots Average | | 13.1 | 0.2 | 0.1 |
| Monocots: | | | | |
| Oats | 1 | 8 | 0 | 0 |
| | 8 | 6 | 0 | 0 |
| | 14 | 6 | 1 | 0 |
| Average | | 6.7 | 0.3 | 0.0 |
| Crabgrass | 1 | 17 | 0 | 0 |
| | 8 | 4 | 0 | 0 |
| | 14 | 0 | 2 | 0 |
| Average | | 7 | 0.7 | 0.0 |
| Ryegrass | 1 | 10 | 0 | 2 |
| | 8 | 10 | 0 | 0 |
| | 14 | 6 | 0 | 0 |
| Average | | 8.7 | 0.0 | 0.7 |
| Monocots Average | | 7.5 | 0.3 | 0.2 |

Compound No. 6, [N-(S-benzylthioethyl) phosphoramidothioic dichloride], seems to be a fast-starting desiccant. It is for the most part non-selective in nature and could be useful in cotton and soybeans. In the above tests on bush bean, leaves coming in contact with the 10% active spray were apparently "dry" within 24 hours. Moisture determinations of these leaves 16 hours after treatment showed that they contained only 60.2±4.8% moisture compared to 90.0±3.7% moisture for leaves sprayed with solvent only. Proper formulation may produce, even with lower active rates, better desiccation. The bean plants were not killed by this treatment, as they showed development of new trifoliates within about one week. However, these trifoliates were distorted. All plant species tested reacted much the same manner, but to a different degree. As shown by the rating values in Table II, these effects are not always permanent in nature. This indicates that the compound is more a contact herbicide rather than a systemic compound. Young pigweed was almost completely controlled by Compound No. 6. Acetone has shown to be non-toxic and is considered a good solvent for this type of test.

As it will be illustrated further below, with Compound No. 1, proper formulation of the herbicidal composition can greatly enhance the effect of active compounds.

*Test Method No. 3.—Phytotoxicity evaluation by seed germination technique*

In this method the candidate chemical is prepared as a Wettable Powder for testing purposes. The carrier is a pre-mix of Hi Sil 232: 92%, Marasperse N: 4% and Pluronic L–61: 4%, all percentages by weight. Hi Sil 232 is a very absorbent silica material. Marasperse N and Pluronic L–61 are surface active agents and their chemical nature is described elsewhere in this specification. The Wettable Powder consists of 25% by weight of the active chemical and 75% by weight of the pre-mix. Dilution of the Wettable Powders to applied concentration is by addition of water. Dosages given are for the active compound present in the final dispersion when applied.

Candidate chemicals, at dosages indicated, are pipetted in 5 cc. quantities onto filter paper contained within plastic petri dishes. Seeds of the selected crops are then placed on the treated disks and observed for germination for a period of time. The number of seeds germinating and general observations on extent of root and cotyledon damage is an index of herbicidal potential of the chemical compound. Data on percent seed germination and any unusual growth behaviors are noted on the seventh day. The results in Table III are at a single dosage level of 2500 p.p.m. Two criteria were recorded: (1) the percentage of the seeds germinating; and (2) the phytotoxicity not only to the seeds as indicated by percent emergence but also by the extent of phytotoxicity to the germinating and growing seedlings as determined by the extent of damage to the roots and to the cotyledons. The phytotoxicity ratings, indicated in the table as P.R., is on a scale of from 0 to 5, with 0 indicating no injury and 5 indicating a condition of severe phytotoxicity, or complete killing of the seeds or of the emerging seedlings. Barley, radish, flax and tomato were used in the test. Table III shows the results.

TABLE III

| Chemical | Evaluation | Barley | Radish | Flax | Tomato |
|---|---|---|---|---|---|
| Compound No. 1 | Percent Emergence | 18 | 38 | 26 | 0 |
| | P.R. | 4 | 1 | 4 | 5 |
| Check (Control) | Percent Emergence | 84 | 74 | 76 | 42 |
| | P.R. | 0 | 0 | 0 | 0 |

The degree of phytotoxicity on tomato was at the maximum level. Barley and flax showed strong effect. Radish showed moderate effect.

*Test Method No. 4.—Fungicide screen*

The object of this test is to determine effect of chemicals in inhibiting growth of fungus, *Helminthosporium avenae*, contained within and on the surface of naturally infected oat seed. Oat seed, known to be heavily infected with *Helminthosporium avenae*, is treated with the candidate chemical at various dosages for a period of fifteen minutes by immersion. At the end of this period the solution is drained off and the seeds are plated out on petri dishes containing moistened filter paper. Lack of control is evident by the dark colored organism sporulating in profusion on the seed surface and on the filter paper adjoining the seed. Data are taken on percent disease control at appropriate intervals after initiation of the test. As source of the dosage the same Wettable Powder is used as described in Test Method No. 3. Compound No. 1 showed in this test at 5000 p.p.m. 0.0% germination and 100% disease control, while the check (control) showed 62% germination and 10% disease control. At 500 p.p.m. concentration the compound did not show results much different from the check. Fungicidal activity is indicated when used at proper concentration.

As some herbicides have insecticidal activity also, two tests were carried out with Compound 1, reported in Test Methods No. 5 and 6.

*Test Method No. 5.—Contact residual film test with Tribolium confusum*

The general procedure in this method is to prepare the chemical to be used either as Wettable Powder or in form of Acetone solution, if the material is acetone soluble. The chemical is brought to the proper dosage level. The next step is to deposit 1 ml. of the chemical-dosage to be tested uniformly over a 9.6 cm. diameter petri dish. The distribution of the film is carried out either by a swirling motion of the petri plate or by uniformly depositing it in a drop form by the use of the end of a pipette. The deposit is then permitted to dry to a thin film-like layer. Adult Confused Flour Beetles, priorly starved for 24 hours, are then placed ten per plate on duplicate test vessels. The petri plates are closed during observation. The insects are observed for behavior the first few hours and mortality rates are recorded. Compound No. 1 showed in 24 hours 20% of the insects affected, none killed; in 48 hours 100% affected, none killed and in five days 90% killed and the remaining 10% affected. The check showed none killed and none affected throughout the 5-day observation period. The dosage level was 5000 p.p.m.

*Test Method No. 6.—Contact exposure to film with Drosophila melanogaster*

Drosophila (Pomace Fly) cultures are carried in routine manner under controlled temperature and humidity conditions. The breeding and rearing cycle is handled in a manner to assure testing of adults of uniform age. Test materials are deposited within 200 ml. test tubes (25 mm. x 200 mm.) in a volatile solvent, such as acetone, and immediately mechanically rotated to obtain a thin film of the toxicant on the walls of the test vessels. Ten flies are released into each test vessel (tube) and then stoppered with an absorbent cotton plug holding a protruding tip (Dental Gum) impregnated with sufficient liquid food to carry the flies for three days.

Compound No. 1 was tested by this method at 1000 p.p.m. dosage level. The mortality observed was in two hours: 10%, in six hours: 50% and in twelve hours: 100%. The check showed no mortality up to six hours and 4% mortality after twelve hours.

Many herbicides change post emergent activity depending on formulations of the respective concentrates. Some are sensitive to age of plants to which they are applied to. They may have narrow critical concentration limits or broad concentration limits within which they are active. To investigate these points with the products of this invention, Compound No. 1, [O-(2-naphthyl) phosphorodichloridothionate], was selected for illustrative purposes. Test Method No. 7 describes the investigation carried out. There are several sets within the scope of this method.

*Test Method No. 7.—Post emergent activity of Compound No. 1*

In this investigation seven plants were tested in flats and five in pots. Some of the latter were not always present in all the sets. The plants tested in pots had to have different age at the time of testing from those in flats. Some of the plants were dicots (dicotyledons), marked below with (D), others were monocots (monocotyledons), marked below with (M). The selected plants represent classes. The plants were as follows:

(1) Beets (D), represents an economic crop.
(2) Tomato (D), indicative for growth regulative effects (Auxin Effect).
(3) Radish (D), crucifera family, represents many weeds.
(4) Flat (D), very susceptible, also represents a family of plants.
(5) Ryegrass (M), represents a lawn grass, resistant type.
(6) Oats (M), related to wild oats, a weed family.
(7) Wheat (M), a resistant type to herbicides, helps to establish selectivity.
(8) Cotton (D), selected for defoliant effects.
(9) Beans (D), indicates growth regulatory effects and defoliant effect.
(10) Crabgrass, represents a class of weeds, measures completeness of phytotoxicity effect.
(11) Large Tomato (D), to check correlation with (2).
(12) Lambs Quarter, a typical weed family.

Application is made from emulsion concentrates or wettable powder concentrates, diluted to the proper dosage by water. Quantities applied per flat and/or per three pots varied from 25 ml. to 30 ml., as indicated in the individual sets. Dosage, expressed as p.p.m., relates to the concentration of the active compound in the total liquid at time of application. As the concentration and amount of liquid applied varies in the sets, it is useful to express the quantity applied in the individual sets on a pounds per acre basis of active compound. Such calculations are rather complicated and involved. Therefore the figures to be given below should be taken more in correlation with each other, than indicating accurate measurement of pounds per acre. The basis for the figures to be given is, that at the application of 30 ml. of liquid, having a concentration of 4000 p.p.m., we have a five pounds per acre dosage. Whereas it is believed, that this is close to practical facts, it should be considered as an assumption on which the numerical figures are based. The given quantity of liquid is sprayed on each single flat or on three pots. Where pots are used, they are of the 4 inch size. Spraying is carried out with precision spray equipment on special turntables designed for this purpose. Spray application is made at 10 p.s.i. pressure. The 25 or 30 ml. of spray solution is just sufficient to thoroughly wet the foliage without reaching the "run off" point. The flats and pots are raised in the greenhouse and transferred prior to spray application for 48 hours under a special lighting system to secure a greater uniformity of growth prior to application. After spray application the plants are also held for 24 hours under the artificial lighting system and then transferred to the greenhouse.

In scoring the plants, a rating system is used ranging from zero to ten. This is called phytotoxicity rating (P.R.). Zero indicates that there was no effect on the plants. Ten indicates either that the plants were killed or so severely injured that there would be no possibility of recovery. Intermediate values between zero and ten indicate graduations of severity of damage. This covers a multitude of symptoms which might be described as caustic, necrotic, chlorotic, stunting, growth suppression, etc. Frequently plants tend to recover in the form of new growth. When this occurs, it is pointed out. Any and all abnormal effect is recorded. In the tables below, giving the results of the tests, the numerical figures are P.R. values obtained.

*Set No. 1*

In this set the first seven plants were in flats and were approximately 21 days (3 weeks) old when sprayed. In pots were: cotton (approximately 7 weeks old), crabgrass (in the seedling stage and approximately 4 weeks old), and beans (Red Kidney), which had well developed trifoliate leaves (also about 4 weeks old). Spray solutions were at 4000 p.p.m. and 2000 p.p.m. concentration. Spray solution quantity: 30 ml., corresponding with the two concentrations to 5 lbs./acre and 2½ lbs./acre dosage. Observations were made 2 days and 7 days after spray application.

Emulsion concentrates were made according to the following basic formula:

Compound No. 1 _____percent by weight__ 10
Triton X–161 _____do____ 10
Solvent _____percent by volume__ 80

Triton X–161 is described elsewhere in this specification. In this set No. 1 two solvents were used, as follows:
Solvent A: Espesol–5, 100%.
Solvent B: Methyl acetate 20% and Velsicol AR 50G 80%, in admixture. Espesol–5 (Sp.Gr. 0.860 to 0.870, boiling range 138.0° C. to 141.5° C.) is a xylene type solvent derived from petroleum. Velsicol AR 50G is a rather high boiling methylated naphthalene hydrocarbon solvent, having a K.B. value of 80, initial boiling point of 390° F. and end point of 550° F. Solvent percentage is by volume. Table IV shows the results.

The following solvents or solvent mixtures were used in this set:

(1) Dimethyl formamide,
(2) Acetophenone,
(3) Acetone,
(4) Phenyl Cellosolve,
(5) Velsicol AR 50G,
(6) 20% methyl acetate and 80% Velsicol AR 50G,
(7) 10% butyl carbitol acetate and 90% Velsicol AR 50G,
(8) 25% methyl isobutyl ketone and 75% Eureka white oil,
(9) 25% xylene and 75% White seal oil,
(10) Xylene,
(11) Heavy aromatic naphtha,
(12) 10% butyl carbitol acetate and 90% xylene,

TABLE IV

|  | Solvent A | | | | Solvent B | | | |
| --- | --- | --- | --- | --- | --- | --- | --- | --- |
|  | 4,000 p.p.m. | | 2,000 p.p.m. | | 4,000 p.p.m. | | 2,000 p.p.m. | |
|  | 2 days | 7 days | 2 days | 7 days | 2 days | 7 days | 2 days | 7 days |
| Beets | 3 | 4 | 2 | 3 | 7 | 8 | 3 | 4 |
| Tomato | 9 | 10 | 8 | 8 | 9 | 10 | 9 | 9 |
| Radish | 4 | 7 | 1 | 2 | 8 | 10 | 4 | 5 |
| Flax | 10 | 10 | 8 | 10 | 10 | 10 | 10 | 10 |
| Ryegrass | 5 | 4 | 1 | 1 | 8 | 8 | 2 | 1 |
| Oats | 7 | 6 | 6 | 2 | 9 | 9+ | 7 | ³ 6 |
| Wheat | 5 | 4 | 3 | 1 | 5 | 3 | 3 | 2 |
| Cotton | 9 | ¹ 9 | 5 | ¹ 5 | 9 | ¹ ³ 9 | 5 | ¹ 8 |
| Crabgrass | 9 | 9 | 7 | 5 | 8 | 6 | 8 | 7 |
| Beans | 7 | ² 5 | 4 | ² 3 | 8 | ² 9 | 3 | ² 3 |

¹ Cotton in 7 days with Solvent A at 4,000 p.p.m. showed 50% defoliation and 50% desiccation; at 2,000 p.p.m. neither defoliation, nor desiccation. With Solvent B at 4,000 p.p.m. 80% defoliation and 20% desiccation; at 2,000 p.p.m. 100% defoliation and no desiccation.
² Beans showed in 7 days with Solvent A both at 4,000 p.p.m. and 2,000 p.p.m. 25% defoliation and no desiccation. With Solvent B at 4,000 p.p.m. 30% defoliation and 75% desiccation, and at 2,000 p.p.m. 20% defoliation and no desiccation.
³ Older leaves hit by spray are dying.

Generally speaking in most cases Solvent B was more effective than Solvent A. Flax and tomato were most affected. Wheat and beets were least affected, joined by ryegrass at the lower concentration. The difference between oats and wheat is most striking. The defoliant and/or desiccant effect on cotton and/or beans is significant. In the majority of cases lack of recovery is indicated by higher P.R. values for 7 days readings vs. 2 days readings. In some cases slight recovery was indicated. It should be noted, that the results were obtained under the conditions of Set No. 1. Particularly the age of the plants at time of application has to be kept in mind.

*Set No. 2*

In this set various solvents and solvent mixtures were tested. The plants were the same, except that instead of crabgrass in the pots large tomatoes were substituted. The 7 crops in flats were 13 to 14 days old at the time of spray application. The oats were in the 1½ leaf stage of growth. Most of the other crops were in the cotyledonary leaf stage of development, with the first true leaves just about to emerge. The crops in pots (cotton, beans and large tomato) were approximately six to seven weeks old, in order to study on that age group defoliation or desiccation effects. At the 2000 and 1000 p.p.m. concentration buckwheat was replaced for flax. In this set (in contrast to Set No. 1) 25 ml. spray solution was used, in all cases at 3000 p.p.m. and in some cases additionally at 2000 and/or 1000 p.p.m. concentration. In this set 3000 p.p.m.=about 3.1 lbs./acre, 2000 p.p.m.=about 2.07 lbs./acre and 1000 p.p.m.=about 1.03 lbs./acre dosage level. Observation was made on the 9th day after spraying or on the 10th day after spraying. The basic formula for the emulsion concentrates was the same as in Set No. 1, with the solvent being varied.

(13) Butyl carbitol acetate,
(14) #9 oil,
(15) 25% butyl carbitol acetate and 75% #9 oil,
(16) 25% isopropyl acetate and 75% #9 oil, and
(17) Butyl carbitol acetate check (without active chemical).

Eureka white oil, White seal oil and #9 oil are high boiling point petroleum hydrocarbon oils, similar to paraffin oils. Dimethyl formamide, acetophenone and acetone gave inactive results with zero P.R., indicating chemical reaction with Compound No. 1, or retardation of its effect. The only exception was flax with P.R. 5 for acetophenone and P.R. 2 for acetone at 3000 p.p.m. Oats and cotton were also slightly affected by acetone. In the butyl carbitol acetate solvent check, corresponding to 2000 p.p.m. ratio, all values were zero P.R., except radish (P.R. 9) and buckwheat (P.R. 8) were definitely affected. Other solvent checks were also made with no effect on any of the plants. Results with Solvents 4 to 16 are reported below.

Beets were strongly affected at 3000 p.p.m. Seven gave P.R. values of at least 9 and the lowest was P.R. 6 with one solvent. At 2000 p.p.m. the results were very similar. At 1000 p.p.m. only Solvents 6 to 8 were tested, with P.R. ratings from 4 to 6 and strong inhibition of growth in all three cases.

Tomato behaved similar to beets in the 3000 and 2000 p.p.m. dosage and also in the 1000 p.p.m. dosage with the same three solvents, as beets, also showing inhibition of growth.

Radishes behaved similar to beets at 3000 p.p.m., many solvents showing inhibitive effect and morphogenic changes. At 2000 p.p.m. the P.R. ratings were from 5 lowest to 8 highest. Only #9 oil gave a rating of 3. The three solvents tested at 1000 p.p.m. gave ratings from P.R. 3 to 5, with growth inhibition and morphogenic changes.

Flax was tested at 3000 p.p.m. dosage only. Nine solvents gave P.R. 10, two gave P.R. 9 and two gave P.R. 8, showing sensitivity of flax to this compound with the solvents used. At 2000 p.p.m. and 1000 p.p.m. dosage buckwheat replaced flax and gave similar results than tomato, except Solvents Nos. 5, 7 and 12 gave P.R. ratings of 5 at 2000 p.p.m.

Ryegrass was also strongly affected at 3000 p.p.m., ranging from P.R. 8 to 10, except Solvent No. 4, which gave a reading of 5. The 2000 p.p.m. dosage gave greater differences. P.R. ratings for various solvents was as follows: Solvent No. 16=9, No. 15=8, Nos. 6, 13 and 14=5, Nos. 5 and 12=1, and No. 7=0. At 1000 p.p.m. dosage Solvents Nos. 5 and 7 gave zero P.R., whereas No. 6 gave P.R. 1. Ryegrass apparently requires higher concentrations for effective results.

Oats gave P.R. values of 7 to 10 in most cases at 3000 p.p.m. dosage, with the exception of Solvents No. 15=4 and No. 16=5. The P.R. values at 2000 and 1000 p.p.m. were much lower, indicating that oats behave like ryegrass and require higher concentration for effectiveness with the solvents tested in this set.

Wheat was generally less affected. At 3000 p.p.m. dosage P.R. values ran 3 to 7, with the exception of butyl carbitol acetate, which yielded P.R. 1. At 2000 p.p.m. dosage the effect was greatly reduced, ranging from P.R. 0 to 3. At 1000 p.p.m. with the three solvents tested the P.R. was zero, indicating no effect.

Cotton showed great differences at 3000 p.p.m. dosage. No defoliation was observed. The P.R. values and desiccation percentages were as follows with the respective solvents: No. 4=9, 90%; No. 5=9, 60%; No. 6=4, 10%; No. 7=5, 20%; No. 8=8, 60%; No. 9=7, 40%, growth inhibited; No. 10=1, 0%; No. 11=5, 25%, growth inhibited; the remainder showed no desiccation and the P.R. values were No. 12=3; No. 13=1; No. 14=2; No. 15=3; No. 16=2. The 2000 and 1000 p.p.m. dosages were inactive, showing P.R. ratings of 1 to 2.

Beans at 3000 p.p.m. showed greater effect than cotton, coupled in many cases with substantial desiccation (no defoliation). P.R. values and desiccation percentages were as follows: Solvent No. 4=10, 100%; No. 5=5, 0%; No. 6=4, 0%; No. 7=5, 0%; No. 8=7, 0%; No. 9=5, 0%; No. 10=1, 0%, growth inhibited; No. 11=5, 0%, growth inhibited; No. 12=10, 100%; No. 13=8, 70%; No. 14=7, 40%; No. 15=10, 100%; and No. 16=8, 60%. At 2000 p.p.m. dosage P.R. values ran from 5 to 6 and desiccation from 10% to 60%, with the exception of No. 16=P.R. 3. However, at this dosage defoliation was observed with two solvents; No. 6=70% and No. 7=50%.

Large tomatoes were tested only at 3000 p.p.m. dosage, and only with Solvent No. 4 to 11. Growth inhibition showed in every case, except with xylene, where the plants remained normal in size. The most effective was phenyl Cellosolve with a P.R. value of 8. The rest ranged from P.R. 4 to 7, except xylene showed P.R. 1.

Lambs Quarter was tested with 2000 to 1000 p.p.m. dosage only and with Solvents Nos. 5 to 7 and 12 to 16. At 2000 p.p.m. P.R. values ranged from 3 to 6. Solvent No. 15 gave P.R. 6 and Solvents Nos. 12 and 13 gave P.R. 5. At 1000 p.p.m. the ratings were P.R. 1 to 3.

With regard to the individual solvents, the following could be stated. Velsicol AR 50G and solvents containing it, were very active. #9 oil and solvents containing it, also showed strong effect. The addition of butyl carbitol acetate increased activity with a number of plants and this solvent, when used alone, was also effective. Phenyl Cellosolve was very selective, giving high P.R. values for flax, cotton, beans and large tomatoes, lower values with the others and P.R. 1 with oats and wheat, when used at 3000 p.p.m. dosage. Xylene and heavy aromatic naphtha was active (even P.R. 10) with flax, ryegrass, oats and wheat, and less active with the other plants.

As a general conclusion it may be stated, that the solvent content in the emulsion concentrates varies the results to a considerable extent.

*Set No. 3*

The purpose of this set was to study effect on plants of different ages, to compare kerosene as solvent with other hydrocarbon solvents and to compare emulsion concentrates with a wettable powder formulation. The spray solution was 30 ml. at a concentration of 2000 p.p.m., corresponding to 2½ lbs./acre. The seven plants in flats were 13 days and 17 days old at time of spraying. All seven plants were tested at both ages. In the pots cotton was six weeks old, beans 3 weeks old and large tomatoes 5 weeks old. With five solvents Emulsion concentrates were made according to the basic formula of Set No. 1, and as sixth item the Wettable Powder concentrate was used described in Test Method No. 3.

The solvents tested were:

(1) #9 oil,
(2) #9 oil 90% and tributyl phosphate 10%,
(3) Velsicol AR 50G,
(4) Kerosene,
(5) Xylene, Item (6) was the Wettable Powder.

Table V shows the results, with observation made seven days after spraying.

TABLE V

| Plant tested | #9 Oil | | #9 Oil 90% plus T.B.P. 10% | | Velsicol AR 50G | | Kerosene | | Xylene | | Wettable Powder | |
| --- | --- | --- | --- | --- | --- | --- | --- | --- | --- | --- | --- | --- |
| | 13 days | 17 days | 13 days | 17 days | 13 days | 17 days | 13 days | 17 days | 13 days | 17 days | 13 days | 17 days |
| Beets | 4 | 8 | 5 | 6 | 7 | 7 | 5 | 6 | 6 | 5 | 8 | 4 |
| Tomato | 3 | 6 | 7 | 8 | 1 | 5 | 3 | 8 | 4 | 3 | 8 | 6 |
| Radish | 3 | 5 | 7 | 9 | 3 | 3 | 5 | 3 | 1 | 1 | 6 | 5 |
| Flax | 8 | 8 | 7 | 9 | 8 | 8 | 8 | 8 | 5 | 5 | 5 | 5 |
| Ryegrass | 1 | 1 | 3 | 5 | 7 | 8 | 2 | 1 | 3 | 2 | 2 | 1 |
| Oats | 2 | 4 | 7 | 6 | 6 | 7 | 5 | 3 | 7 | 1 | 4 | 1 |
| Wheat | 1 | 2 | 8 | 8 | 6 | 7 | 2 | 1 | 7 | 2 | 1 | 1 |
| Cotton | 5 | | 3 | | 5 | | 7 | | 4 | | 3 | |
| Beans | 3 | | 3 | | 1 | | 0 | | 1 | | 4 | |
| Large Tomato | 7 | | 2 | | 7 | | 8 | | 3 | | 8 | |

In the majority of the cases the activity was greater on the older plants, than on the younger plants. In a number of cases the younger plants were more affected, e.g. in the case of oats. In some cases the effect was equal for both ages. Tributyl phosphate (T.B.P.) increased the activity of #9 oil, when mixed in proportion of 10:90, particularly noticeable with wheat. Kerosene is a good solvent and improves selectivity in favor of wheat. The Wettable Powder increases activity towards the younger plants and is particularly active towards beets and tomato, with selectivity in favor of wheat and ryegrass. Kerosene was also very active on cotton and large tomatoes. Four of the six preparations were very active on large tomatoes. Variation of formulation gives great latitude for desired selectivity.

Set No. 4

In this set only the seven plants in flats were tested. The purpose of the set was to study the effect of emulsifying agent and the dosage of the active compound with two simple inexpensive solvents, preparing emulsion concentrates. Checks were also made with blank emulsion concentrates, which had the solvent and emulsifying agent without the presence of the active compound. 30 ml. of spray solution was used at 4000, 3000 and 2000 p.p.m. dosage level. These corresponded to 5 lbs./acre, 3¾ lbs./acre and 2½ lbs./acre dosage levels. The plants were 14 days old and observation was made twelve days after spraying. The emulsion concentrates had the following basic formulation:

Compound No. 1 _____ percent by weight__ 10
Emulsifying agent _____ do____ 10
Solvent _____ percent by volume__ 80

Kerosene and Velsicol AR 50G were the two solvents tested with each of the three emulsifying agents. The 3 emulsifying agents were:

(1) Triton X-161, blend of alkyl aryl polyether alcohols with organic sulfonates;
(2) Emcol H-83T, blend of polyoxyethylene ethers and oil soluble sulfonates;
(3) Agrimul GM, aromatic sulfonate-oxide condensate blend.

All three emulsifying agents were blends of anionic and nonionic surface active agents.

The checks were applied in a manner, that quantity of solvent and emulsifying agent sprayed on the plants should be equal to their quantity when applied at the 2000 p.p.m. concentration of the emulsion concentrates. Table VI shows the results. In Table VI abbreviations are used: 4/M=4000 p.p.m. concentration. The emulsifying agents are also abbreviated in an obvious manner.

From the two solvents Velsicol AR 50G was more active. The increase in activity is particularly interesting with ryegrass, oats and wheat. Radish, tomato and flax were least sensitive to the solvent variation. As far as the emulsifying agents are concerned, in the overall picture, with Kerosene as solvent, the ratings from most active to least active were: Emcol H-83T, Triton X-161 and Agrimul GM. With Velsicol AR 50G solvent the ratings from most active to least active were: Triton X-161, Agrimul GM and Emcol H-83T, with the differences being minor in degree. When averaging both solvents and all three emulsifying agents, the ratings were from most to least active: Triton X-161, Emcol H-83T and Agrimul GM. In addition to the averages the work of Table VI shows interesting selectivity for optimum results by varying the solvent and emulsifying agent. As an example we could take Velsicol AR 50G with Triton X-161 at 2000 p.p.m., which was very effective against beets, tomato and flax, slightly effective against radish and ryegrass and ineffective against oats and wheat. It could be effectively used to protect plants of the type of oats and wheat while affecting weeds of the type of the family of beets, tomato and flax.

Set No. 5

This set was prepared to study the effect of active compound concentration in the emulsion concentrates. The emulsifying agent was maintained in all three formulations at a 10% level (constant) and the active compound concentration was at 10%, 20%, and 30% level, correspondingly changing the solvent quantity from 80%, to 70% and 60% respectively. The emulsion concentrates had the following formulations:

|  | Formula A | Formula B | Formula C |
|---|---|---|---|
| Compound No. 1, percent by wt. | 10 | 20 | 30 |
| Triton X-161, percent by wt. | 10 | 10 | 10 |
| Velsicol AR 50G, percent by vol. | 80 | 70 | 60 |

The dosage levels were based on active compound concentration derived from the three emulsion concentrates. Spray solution was 30 ml. at concentrations of 4000 p.p.m. and 2000 p.p.m., corresponding to 5 lbs./acre and 2½ lbs./acre dosage levels. Only the seven plants in flats were tested in this set. The age of the plants was 14 days

TABLE VI

|  | Kerosene |  |  |  |  |  |  |  |  | Velsicol AR 50G |  |  |  |  |  |  |  |  |
|---|---|---|---|---|---|---|---|---|---|---|---|---|---|---|---|---|---|---|
|  | X-161 |  |  | H-83T |  |  | GM |  |  | X-161 |  |  | H-83T |  |  | GM |  |  |
|  | 4/M | 3/M | 2/M | 4/M | 3/M | 2/M | 4/M | 3/M | 2/M | 4/M | 3/M | 2/M | 4/M | 3/M | 2/M | 4/M | 3/M | 2/M |
| Beets | 6 | 6 | 3 | 9 | 9 | 5 | 6 | 6 | 3 | 9 | 9 | 10 | 10 | 9 | 1 | 10 | 10 | 7 |
| Tomato | 10 | 8 | 5 | 10 | 1 | 7 | 9 | 8 | 6 | 10 | 10 | 10 | 10 | 10 | 4 | 10 | 10 | 8 |
| Radish | 10 | 5 | 3 | 6 | 5 | 1 | 5 | 3 | 2 | 10 | 10 | 3 | 10 | 8 | 4 | 10 | 10 | 2 |
| Flax | 10 | 9+ | 9+ | 10 | 9 | 8 | 9 | 9 | 9 | 10 | 10 | 9 | 10 | 10 | 8 | 10 | 10 | 8 |
| Ryegrass | 3 | 1 | 1 | 3 | 2 | 1 | 2 | 1 | 1 | 9 | 5 | 4 | 5 | 5 | 3 | 6 | 5 | 2 |
| Oats | 2 | 1 | 1 | 3 | 2 | 1 | 1 | 1 | 1 | 9 | 9 | 1 | 10 | 8 | 2 | 6 | 6 | 2 |
| Wheat | 2 | 1 | 1 | 2 | 2 | 1 | 1 | 1 | 0 | 7 | 5 | 1 | 6 | 3 | 1 | 5 | 2 | 1 |
| Checks: |  |  |  |  |  |  |  |  |  |  |  |  |  |  |  |  |  |  |
| Beets | 1 |  |  | 1 |  |  | 1 |  |  | 2 |  |  | 2 |  |  | 1 |  |  |
| Tomato | 2 |  |  | 2 |  |  | 2 |  |  | 2 |  |  | 2 |  |  | 2 |  |  |
| Radish | 2 |  |  | 2 |  |  | 1 |  |  | 2 |  |  | 2 |  |  | 2 |  |  |
| Flax | 2 |  |  | 2 |  |  | 1 |  |  | 3 |  |  | 2 |  |  | 3 |  |  |
| Ryegrass | 0 |  |  | 9 |  |  | 1 |  |  | 1 |  |  | 1 |  |  | 0 |  |  |
| Oats | 0 |  |  | 9 |  |  | 1 |  |  | 2 |  |  | 1 |  |  | 1 |  |  |
| Wheat | 0 |  |  | 0 |  |  | 1 |  |  | 1 |  |  | 1 |  |  | 1 |  |  | at time of spraying. Observations were made twelve hours and eight days after spraying. Table VII illustrates the results.

thioic dichloride]. Next follow Compound No. 3 [O-(p-methoxyphenyl) phosphorodichloridothionate] and Compound No. 4 [O-(p-cresyl) phosphorodichloridothionate].

TABLE VII

| Plant | Formula A | | | | Formula B | | | | Formula C | | | |
|---|---|---|---|---|---|---|---|---|---|---|---|---|
| | 4,000 p.p.m. | | 2,000 p.p.m. | | 4,000 p.p.m. | | 2,000 p.p.m. | | 4,000 p.p.m. | | 2,000 p.p.m. | |
| | 12 hours | 8 days | 12 hours | 8 days | 12 hours | 8 days | 12 hours | 8 days | 12 hours | 8 days | 12 hours | 8 days |
| Beets | 9 | 10 | 9 | 10 | 9 | 10 | 8 | 10 | 6 | 9 | 6 | 7 |
| Tomato | 8 | 10 | 8 | 10 | 8 | 10 | 2 | 10 | 4 | 10 | 4 | 10 |
| Radish | 9 | 10 | 9 | 10 | 9 | 10 | 6 | 10 | 2 | 6 | 7 | 6 |
| Flax | 6 | 10 | 9 | 10 | 9 | 10 | 6 | 10 | 4 | 10 | 4 | 10 |
| Ryegrass | 5 | 10 | 6 | 10 | 7 | 10 | 4 | 10 | 2 | 8 | 2 | 8 |
| Oats | 5 | 10 | 5 | 10 | 6 | 10 | 3 | 9 | 2 | 9 | 2 | 8 |
| Wheat | 8 | 10 | 8 | 10 | 8 | 8 | 5 | 7 | 8 | 4 | 8 | 4 |
| Total P.R. | 50 | 70 | 54 | 70 | 56 | 68 | 30 | 66 | 28 | 56 | 33 | 53 |

The following conclusions can be drawn from Table VII: (1) In the overall picture the 10% type emulsion concentrate is best, followed by the 20% and 30% emulsion concentrates in that order. The percentages are for the active compound in the emulsion concentrate. (2) If the observations are made after 8 days, the differences in activity between the three concentrates are less, than when observations are made after 12 hours. (3) Dosage differences are also more pronounced in their effect with the observations after 12 hours, than with the ones after 8 days. (4) After 8-day observation period the effects were very similar with the two dosages tested (4000 and 2000 p.p.m.).

When considering the results of Table VII, it should be kept in mind, that the formulations greatly changed the proportion of emulsifying agent and solvent per 100 weight parts of Compound No. 1. Therefore in the final dosage levels, where the active compound was kept constant at the respective dosage, the emulsifying agent quantities and solvent quantities varied substantially. This may have contributed to the results. Presence of protective colloids in the ultimate emulsions may improve the activity of emulsion concentrates with high active compound concentraiton.

In the overall performance Compound 1, [O-(2-naphthyl) phosphorodichloridothionate], is best, followed by Compound No. 6 [N-(S-benzylthioethyl) phosphoramidothioic dichloride]. Next follow Compound No. 3 ... Compound No. 2 [O-(p-chlorophenyl) phosphorodichloridothionate] is next, followed by Compound No. 5 [O-phenyl phosphorodichloridothionate]. These six compounds are outstanding in performance when compared with other phosphorodichloridothionates known in the art.

We claim:

N-(S-benzylthioethyl) phosphoramidothioic dichloride.

References Cited

UNITED STATES PATENTS

| | | | |
|---|---|---|---|
| 2,676,879 | 4/1954 | Schlesinger | 71—2.3 |
| 2,990,265 | 6/1961 | Hamm et al. | 71—2.3 |
| 3,057,917 | 10/1962 | Maier | 260—543 |
| 3,104,259 | 9/1963 | Harwood et al. | 260—543 |

OTHER REFERENCES

Michaelis, Liebig's Annalen, vol. 326, pp. 129–258 (pp. 201–205 relied on) (1903) QD1L7.

Strecker et al., Berichte Deut. Chem., vol. 49, pp. 63–87 (pp. 81 and 83 relied on) (1916).

LORRAINE A. WEINBERGER, *Primary Examiner.*

JULIAN S. LEVITT, *Examiner.*

J. O. THOMAS, H. C. WEGNER,
*Assistant Examiners.*